Figure 1:
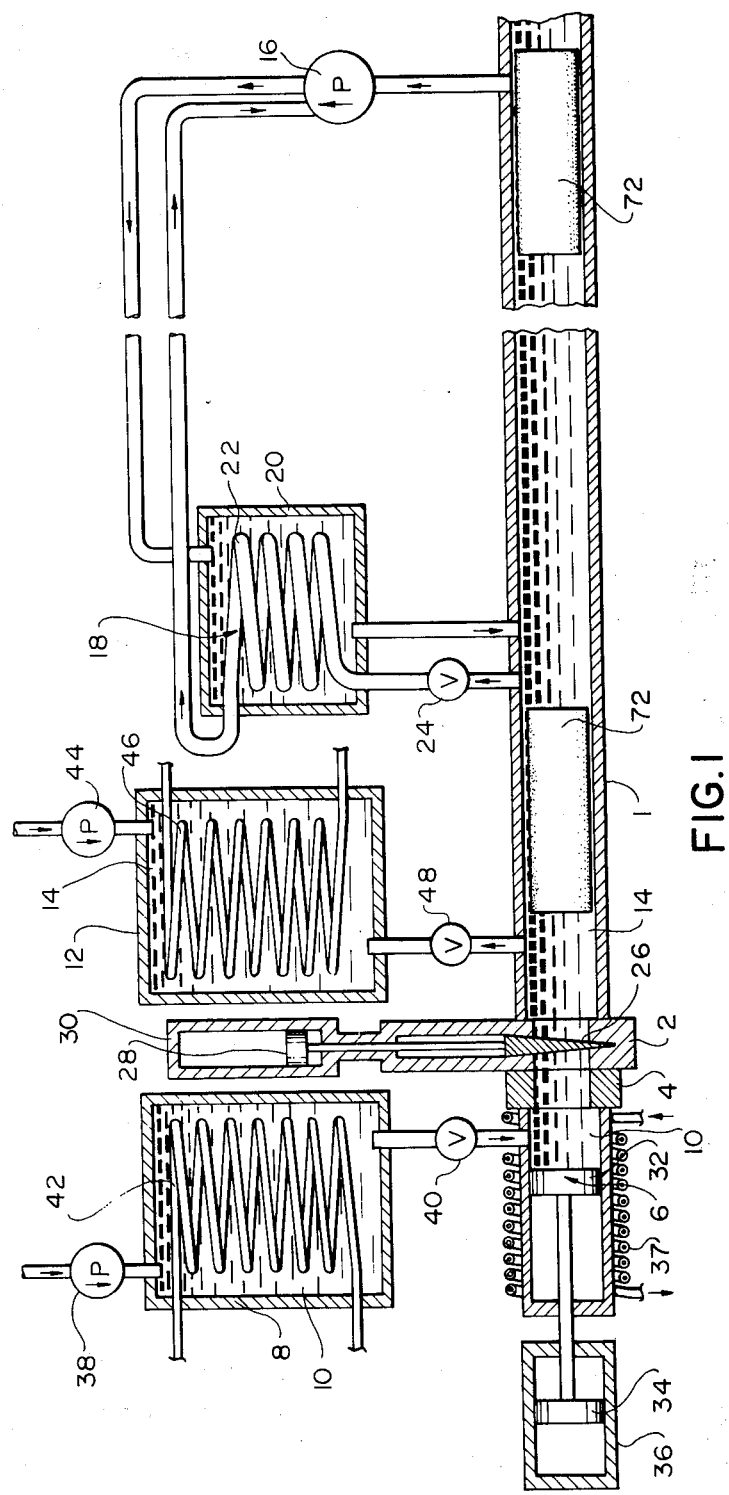

United States Patent
Jensen et al.

[11] 3,906,972
[45] Sept. 23, 1975

[54] METHOD OF TRANS.        OIL AND NATURAL GAS ALONG A PIPELINE

[75] Inventors: Erik J. Jensen; Ronald A. S. Brown; Ernest J. Wiggins, all of Edmonton, Canada

[73] Assignee: Research Council of Alberta, Edmonton, Canada

[22] Filed: May 20, 1974

[21] Appl. No.: 471,834

[30] Foreign Application Priority Data
July 11, 1973  Canada .............................. 176210

[52] U.S. Cl. ..................... 137/13; 62/55; 62/340; 302/66
[51] Int. Cl.² ......................................... B65G 53/30
[58] Field of Search ............. 137/1, 13; 62/55, 340, 62/60; 302/66, 14; 166/DIG. 1

[56] References Cited
UNITED STATES PATENTS

| | | | |
|---|---|---|---|
| 3,190,701 | 6/1965 | Berkowitz | 302/66 |
| 3,730,201 | 5/1973 | Lefever | 302/66 UX |
| 3,864,935 | 2/1975 | Elson | 137/13 |

*Primary Examiner*—Alan Cohan
*Attorney, Agent, or Firm*—Francis W. Lemon

[57] ABSTRACT

The natural gas is pumped along the pipeline in liquefied form. The oil is frozen into discrete, substantially frozen bodies of sufficient size for single row distribution along the pipeline, e.g., frozen into cylindrical slugs or spheres, conveyed along the pipeline in single row distribution of the bodies by the liquefied natural gas, separated from the natural and melted for storage in liquid form. The oil can be extruded directly into the liquefied natural gas, at least an outer portion thereof frozen and then cut into cylindrical slugs, or the oil fed between two conveyor belts carrying semi-spherical cups which, when filled with the oil convey the oil into the liquefied natural gas and release it therein when spheres have been formed with at least an outer frozen skin.

4 Claims, 3 Drawing Figures

METHOD OF TRANSPORTING OIL AND NATURAL GAS ALONG A PIPELINE

This invention relates to a method of transporting oil and natural gas along a pipeline.

Solid materials have been transported by liquid in a pipeline either as finely comminuted materials (slurry pipelines) or as discrete cylinders or spheres having diameters at 0.8 – 0.9 times that of the bore of the carrier pipeline (capsule pipelines). Pipeline transport of solids by these methods is designed to transport the material less expensively than other methods.

It has been proposed in U.S. Pat. No. 3,180,691 dated Apr. 27, 1965, W. Wunsch and W. Puff, to transport solid fuels such as coal along a pipeline by means of a liquefied gas as the carrier substance and then to reconvert the carrier substance from its liquified condition into its gaseous condition to thereby separate the carrier substance from the material transported thereby. This patent deals with solid fuels, that is fuels which are normally solid and remain solid under all conditions, and does not envisage the use of oil which is normally liquid, but solid under pipeline conditions envisaged by the present invention.

It has also been proposed in U.S. Pat. No. 3,670,752, dated June 20, 1972, S. S. Marsden and S. C. Rose, to transport crude oils and tars, such as those from the Prudhoe Bay Oil Field and the Athabasca Tar Sands, through a large diameter, insulated pipeline at temperatures below 32°F, for example between about −15° to 30°F, in the form of 40 to 70% oil in brine emulsions containing salts dissolved in the water in amounts sufficient to prevent freezing. The oil droplets may be semi-solid or solid particles. This proposal has the disadvantage that the brine used to transport the crude oil has no economic value when separated from the crude oil transported thereby.

Natural gas, which is largely methane (CH4) is a commonly used fuel and chemical raw material which is found in nature either alone or associated with liquid petroleum. Its composition varies somewhat from location to location as shown by the two accompanying published analyses which may be regarded as the upper and lower limits in Mole % with respect to content of methane (CH4) in natural gas:

| COMPONENT | ALASKA | LIBYA |
|---|---|---|
| Nitrogen | 0.4 | |
| Methane | 99.6 | 67.8 |
| Ethane | | 19.8 |
| Propane | | 8.7 |
| Butane | | 3.1 |
| Pentane | | .6 |
| | 100.0 | 100.0 |
| Molecular Weight | 16.1 | 22.9 |

Natural gas is usually transported from the locations where it is found to market or user areas as a gas by pipeline. For other uses, however, natural gas as found has been liquefied to take advantage of the lower volume in the liquid state. For liquefaction, methane gas, the major constituent of natural gas, must be cooled below its critical temperature, which is 190.6°K (−116.6°F), and compressed to its critical pressure which is 45.8 atm (673.1 psia). The normal boiling point of liquid methane is 111.7°K (−258.7°F). Natural gas, however, is not wholly composed of methane gas, and varies in composition depending on its origin, and so the effective range at which natural gas will be liquefied is at a temperature in the range 100° – 190°K and a pressure in the range of 700 psia-atmosphere pressure. Recently more interest has been attached to liquid natural gas because of the advantages of liquefaction of natural gas for shipment by ship from offshore sources and of storage for coping with peaking demand by natural gas utilities. In connection with the discoveries of natural gas in such remote locations as Canada's Arctic and Alaska, the possibility of shipping natural gas as a liquid has certain advantages, notably requiring a smaller pipeline for a given energy transport rate and lessening the quality requirements for the line pipe because of the low corrosion and greater cold strength of steel. An additional and important advantage is the marked decrease in the deleterious effect of such a pipeline on permafrost areas through which the pipeline passes. It would be desirable to combine the advantages of transporting solids by liquid in a pipeline, with those of transporting liquefied natural gas in a pipeline, to transport oil and natural gas simultaneously.

More recently, it has been proposed in U.S. Pat. No. 3,730,201, dated May 1, 1973, Keneth W. Lefever, to transmit a petroleum product through a frozen medium, such as perma frost, which is structurally unstable at temperatures at or above freezing. The petroleum product, e.g., a crude petroleum product, is sprayed into the confined liquefied natural gas whereby the petroleum product is frozen into solid droplets, and the frozen droplets and the liquefied natural gas form a pumpable slurry.

Solid droplets can be transported by pipeline in a slurry form with a transport liquid, however, settling of the solid droplets in the transport liquid must be avoided and this necessitates high turbulence in the transport liquid to maintain the slurry and, therefore, such high velocities, that pressure gradients in pipelines for such slurries tend to become undesirably high for long distance application. These high pressure gradients demand an unduly high amount of power to pump the slurry from one end of the pipeline to the other end. Such high power requirements to pump the slurry can only be met by providing either an undesirably high number of pumping stations or very large capacity pumping units. In either case the maintenance costs of maintaining the pumping units in working order are also undesirably high.

A further disadvantage with long distance pipelining of slurries of frozen oil droplets is that the slurry has to have a certain fairly critical concentration of frozen oil droplets in the liquefied natural gas in order for the frozen oil droplets to remain entrained in the liquefied natural gas and effectively transported thereby along the pipeline.

It would be desirable to provide a method of transporting in a frozen form in liquefied natural gas and wherein the pressure gradient in the pipeline is not unduly high for long distance application, the amount of power required to pump the liquefied natural gas and the frozed oil is not unduly high thus avoiding the necessity for either an undesirably high number of pumping stations or very larg capacity pumping stations, and wherein concentration of frozen oil in the liquefied natural gas is not critical but fairly flexible so that the pipeline fill with regard to frozen oil can be varied as the production of frozen oil permits.

According to the present invention there is provided a method of transporting oil and natural gas along a pipeline comprising:

a. pumping the natural gas along a pipeline in a liquefied state,
b. freezing the oil as discrete, substantially frozen bodies of sufficient size for single row distribution only along the pipeline,
c. conveying the said discrete, substantially frozen bodies in the frozen condition in single row distribution along at least a portion of the said pipeline by the said liquefied natural gas being pumped therealong,
d. removing the thus conveyed discrete, substantially frozen bodies from the said liquefied natural gas in the pipeline, and
e. melting the separated discrete substantially frozen bodies for storage in liquid form.

In some embodiments the present invention takes advantage of the low temperature required to maintain the natural gas liquefied, to also maintain the oil in a frozen, solid form. Feasibility tests relating to the present invention have shown that at liquid natural gas temperatures the frozen, solid oil advantageously is only slightly soluble in the carrier, for example, at −260°F, heptane is about 1% by weight soluble with lesser solubilities being exhibited by the higher hydrocarbons which crude oil is predominantly composed of.

In theory the liquefaction of natural gas requires removal of about 387 BTU/lb. of methane, and with heat rejection at ambient temperatures would require about 650 BTU/lb. of work. Practically, natural gas equivalent to about 15% of the product gas is required to 'power' the liquefaction, that is, the equivalent to 150,000 BTU/million BTU, if a portion of the natural gas is used for the liquefaction.

The quantity of cooling required to freeze the crude oil is dependant on the composition, with a reasonable average heat of fusion being about 40 BTU/lb. The method of forming the oil into discrete, substantially frozen bodies will depend largely on the form desired for transport along the pipeline, although ease of freezing into a particular form at the input end of the pipeline and ease of separation at the delivery end of the pipeline are also important factors.

Figure 2:
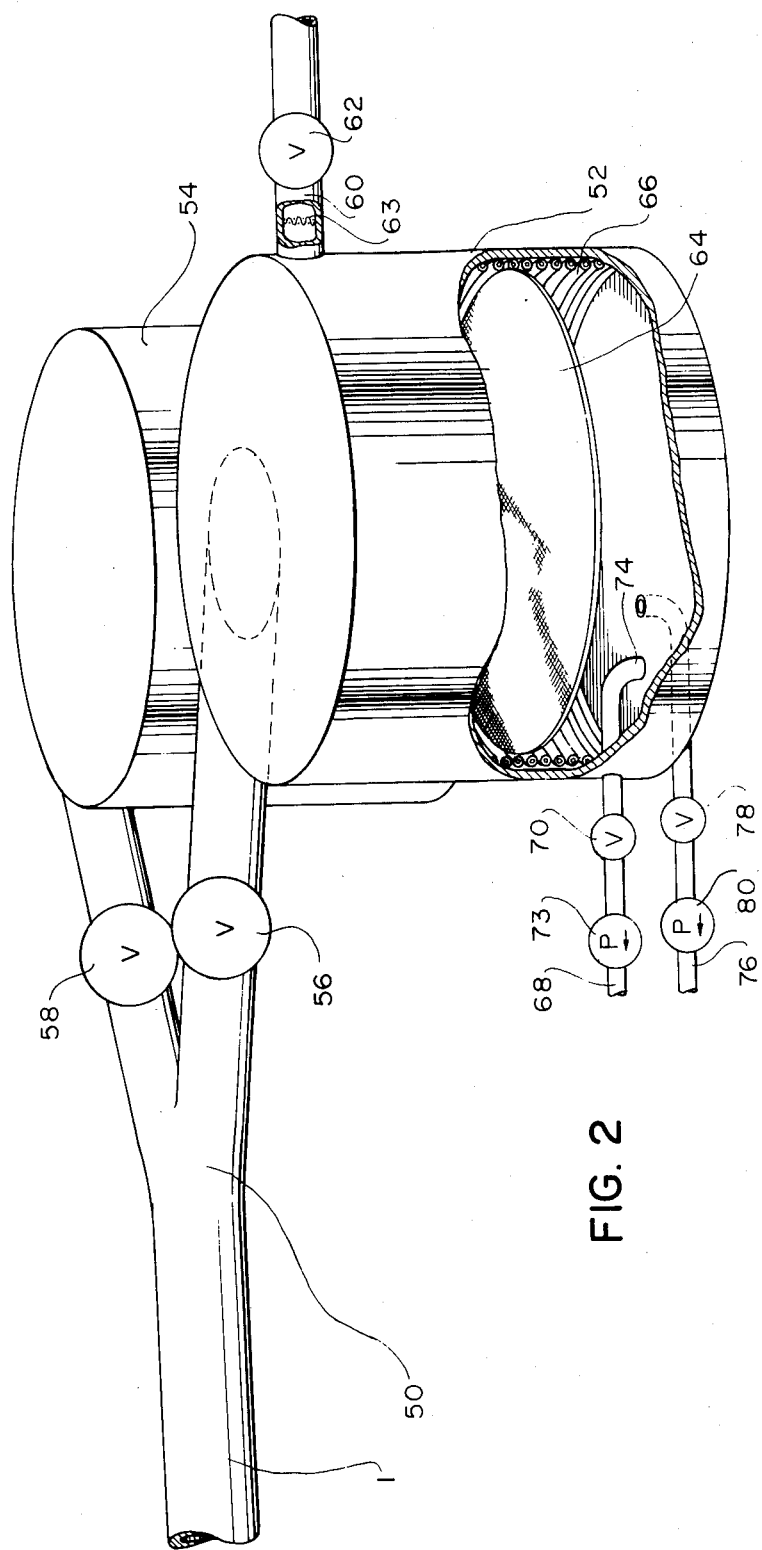
Figure 3:
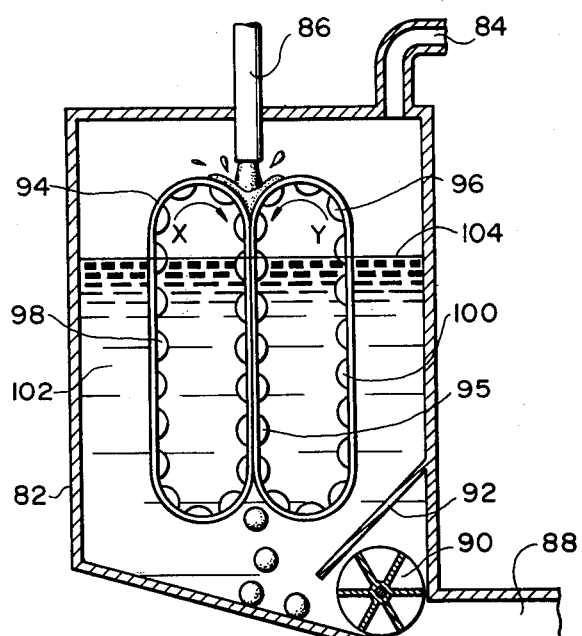

In the accompanying drawings which illustrate, by way of example, embodiments of the present invention:

FIG. 1 is a diagrammatic view of an input end of a pipeline for feeding cylindrical slugs of frozen oil therein, FIG. 2 is a diagrammatic view of the delivery end of the pipeline shown in FIG. 1, and FIG. 3 is a diagrammatic view of a different input end of a pipeline to that shown in FIG. 1, and is for feeding spheres of frozen oil to the pipeline.

In FIG. 1 there is shown a pipeline 1 connected at its inlet end to a gate valve 2 and the extrusion die 4 of a ram extruder 6. A cooled storage tank 8 delivers crude oil 10 to the ram extruder 6, and a cooled storage tank 12 supplied liquefied natural gas 14 therefrom to the pipeline 1.

The pipeline 1 has a liquefied natural gas pump 16 and refrigeration unit 18 at a distance remote from the gate valve 2. The refrigeration unit comprises a heat insulated tank 20 containing a cooling coil 22. The cooling coil 22 is connected by a pressure reducing valve 24 to the liquefied natural gas 14 in the pipeline 1 so that the cooling coil 22 is cooled by the evaporation of liquefied natural gas therein. The evaporated liqufied natural gas in the cooling coil 22 is utilized to drive the pump 16. A plurality of liquefied natural gas pumps 16 and refrigeration units 18 are situated at intervals along the length of the pipeline 1 for refrigeration and repressurization of the liquefied natural gas 14 in the pipeline 1.

The gate valve 2 has a wedge-shaped gate 26 which is reciprocated by a double acting piston 28 in the cylinder 30.

The ram extruder 6 has the ram 32 reciprocated by a double acting piston 34 in a cylinder 36. The ram extruder 6 is cooled by a cooling coil 37, which is cooled by evaporated liquefied natural gas from the cooled storage tank 12.

The cooled storage tank 8 is pressurized with crude oil 10 from a source (not shown) by a pump 38, from a source not shown, and delivers crude oil 10 to the ran extruder 6 through a valve 40. The crude oil 10 in the cooled storage tank 8 is refrigerated by a cooling coil 42, which is cooled by evaporated liquefied natural gas from the cooled storage tank 12. The pump 38 is driven by the evaporated liquefied natural gas from the cooling coil 42.

The liquefied natural gas 14 in the cooled storage tank 12 is supplied with natural gas from a source (not shown) by a pump 44. The cooling by a cooling coil 46 causes the natural gas 14 to be in liquid form rather than gas form. The liquefied natural gas in delivered to the pipeline 1 through a valve 48.

Referring now to FIG. 2, the pipeline 1 is connected at its delivery end by a Y connection 50 to two tanks 52 and 54 via valves 56 and 58 respectively. The tanks 52 and 54 are identical and so a description of the tank 52 and its associated apparatus, will suffice as a description of the tank 54 and its associated apparatus.

The tank 52 has a liquefied natural gas outlet 60 for conveying the liquefied natural gas to a storage tank (not shown). The outlet 60 has a valve 62 and a screen 63 extending across the whole of the bore of the outlet 60. An open mesh screen 64 extends across the whole of the tank 52 and a heating coil 66 lines the whole of the tank 52 interior in a vertical direction. The heating coil 66 may for economy be the heat exchange coil of an air conditioning apparatus during the summer months and otherwise provided with a heating fluid during the winter months.

A secondary liquefied natural gas outlet pipe 68 from the tank 52 has a valve 70 and a pump 73. The end 74 of the pipe 68 in the tank 52 extends downwardly therein to be self draining. An oil outlet pipe 76 from the tank 52 has a valve 78 and a pump 80.

In operation liquefied natural gas 14, stored in tank 12 in liquid form through action of pump 44 and cooling coil 46 is continuously passed through valve 48 into pipeline 1. The liquefied natural gas 14 in pipeline 1 flows therealong to the delivery end, and is pumped by a series of intermediate pumps 16 and cooled by a series intermediate refrigeration units 18 so that the natural gas remains liquefied.

Crude oil 10 is pressurized in tank 7 by fresh crude oil being continuously delivered thereto by pump 38. The cooling coil 42 initially cools the crude oil 10 to a temperature at which the crude oil 10 can still flow fairly readily.

With the gate valve 2 closed the valve 40 is opened and the ram 32 slowly retracted by the double acting piston 34 so that crude oil 10 from the tank 8 fills the ram extruder 6. As the ram extruder 6 is filling with the crude oil 10 the cooling coil 37 cools the crude oil 10 in and entering the ram extruder 6 nearly to a temperature at which that crude oil will freeze solid.

When the ram 32 is fully retracted and the ram extruder 6 filled with cooled crude oil 10, the valve 40 is closed and the gate valve 2 is opened by means of double acting piston 28. The ram 32 is then advanced by means of a double acting piston 34 so that the cooled crude oil 10 is extruded through the die 4 into the liquefied natural gas 14 in pipeline 1.

As the crude oil is extruded through the die 4 the rate of introduction of the crude oil, molded in this manner, into the liquefied natural gas is controlled so that the, liquefied natural gas freezes a skin on the crude oil and thus maintains it in the shape that it is extruded.

When the ram 32 reaches the end of its stroke the gate valve 2 is closed by the double acting piston 28. As the gate valve 2 closes the gate 26 slices a major portion of the extruded crude oil from the remainder. The gate 26 is shaped to a fairly sharp lower edge portion so that the gate 26 will readily cut through the extruded crude oil. The cutaway portion of extruded crude forms one of the discrete, substantially frozen bodies or slugs 72 and is conveyed along the pipeline 1 in single row distribution with the other slugs 72 by the liquefied natural gas 14 flowing therealong. It will be noted that the slugs 72 are extruded of sufficient size for single row distribution only along the pipeline 1.

With the gate valve 2 closed the ram extruder 6 is again filled with crude oil 10 from the tank 9, as the ram 32 is retracted, and then a further slug 72 is extruded and cut free as in the manner previously described.

If it is found that the crude oil 10 does not selflubricate its movement through the die 4, a special lubricating surface, for example, a polyfluorocarbon or silicone lubricant finish, may be provided on the die 4. The gate 26 and bore of gate valve 2 may also be provided with a lubricant finish if it is necessary.

The slugs 72 are carried along the pipeline 1 by the liquefied gas 14 therein and are delivered to the delivery end thereof shown in FIG. 2.

With the valve 56 (FIG. 2) open and the valve 58 closed the slugs 72 are conveyed into the tank 52 and collect on the screen 64. the liquefied natural gas flows out of the tank 52 along outlet 60 while the screen 63 prevents the slugs 72 from entering the outlet 60.

When a sufficient number of slugs 72 have collected in the tank 52 the valve 58 is opened and the valve 56 closed so that the slugs 72 are delivered to the tank 54. The valve 62 is closed and the valve 70 opened so that the pump 73 can pump the tank 52 empty of liquefied natural gas. The liquefied natural gas removed from the tank 52 by the pump 73 is replaced by an inert gas by means not shown.

When the tank 52 is emptied of liquefied natural gas the pump 73 is stopped and the valve 70 is closed. The heating coil 66 is then heated to melt the slugs 72 on the screen to form liquid oil in the tank 52. The valve 78 is then opened and the pump 80 used to pump the liquid oil from the tank 52, which may be fed with further inert gas to replace the liquid oil removed therefrom.

When the tank 54 is filled with slugs 72 the valve 58 is closed and the valve 56 is opened to deliver liquefied natural gas and slugs 72 to the tank 52 once again. As the tank 52 fills with liquefied natural gas the inert gas therein may be bled off by means (not shown) and then the valve 62 opened once more. The liquefied natural gas in the tank 54 is removed therefrom, and the slugs 72 therein are melted and removed therefrom in a liquid form, in the same manner as previously described with reference to the tank 52.

Referring now to FIG. 3, there is shown a different inlet end to that shown in FIG. 1, but which may be used with the delivery end shown in FIG. 2.

In FIG. 3 a tank 82, which is vented by means not shown, to remove liquefied natural gas which is evaporated therein by freezing oil as will be described later, is shown having liquefied natural gas inlet 84, and oil inlet 86 and an outlet 88 for connection to the pipeline 1 (FIG. 1). A vane pump 90 is at the outlet 88 and is beneath a baffle 92. Two endless, vertically mounted steel conveyor belts 94 and 96 are mounted in the tank 82 to be drive, by means (not shown) in the direction X and Y respectively. The conveyor belts 94 and 96 carry semi-spherical cups 98 and 100 respectively, and the conveyor belts drives are synchronized so that the semi-spherical cups 98 and 100 meet between the conveyor belts 94 and 96 to form spherical molds 95.

In operation, the tank 82 is maintained filled with liquefied natural gas 102 by pipe 84 to the level 104 and liquid oil is fed into the tank 82 by pipe 86 to fall between the conveyor belts 94 and 96. The liquid oil falling between the conveyor belts 94 and 96 is directed into the semi-spherical cups 98 and 100 and is trapped between them when they meet and are carried downwardly by the conveyor belts 94 and 96 respectively. As the semi-spherical cups 98 and 100 move downwardly they introduce the trapped oil, molded in this manner, at a controlled rate into the liquefied natural gas 103 so that the trapped oil is at least partially frozen, while molded, sufficiently to retain a spherical shape which is of sufficient size for single row distribution only along the pipeline 1 with other frozen spheres of oil produced in the same manner by the other semi-spherical cups 98 and 100. When the semi-spherical cups 98 and 100 part at the lower ends of the conveyor belts 94 and 96 respectively, the sphere of oil at least partially frozen is released, and having a density somewhat greater than the liquefied natural gas is sinks to the bottom of the tank 82. The bottom of the tank 82 is shaped as a sloping through so that the spheres of oil roll towards the vane-pump 90, the suction side of which is towards the tank 82, so that the vane-pump 90 passes the spheres of oil into the outlet 7 with liquefied natural gas for passage to the pipeline 1 (FIG. 1). The baffle 92 prevents spheres of frozen oil from impairing the vane-pump 90. Thus the vane-pump 90 performs the dual function of sequentially delivering the spheres of oil in single row distribution to the pipeline 1 (FIG. 1) and at the same time pressurizing the pipeline 1.

Frozen cylindrical or spherical capsules or slugs of crude oil could also be injected into the liquefied natural gas by the method shown in Canadian Pat. No. 841,486, dated May 12, 1970.

If a valving system is used for bypassing solid capsules or slugs around booster pumps at intermediate positions along the pipeline then the valving system may use vaporized natural gas, from the liquefied natural gas and used for refrigerating the bulk of liquefied natural gas, to operate the valving system.

In different embodiments, at the delivery end of the pipeline the liquefied natural gas can be separated using a screen conveyor or chain conveyor to convey the frozen crude oil to melting and recovery tanks.

It is economically attractive at the delivery or terminal end to recover the refrigeration energy in the liquefied natural gas and the frozen crude oil where large scale refrigeration is required as, for example, in thermal power plants, liquefaction plants etc.

Transmission of crude oil with liquefied natural gas, according to the present invention, whether carried out as the slug or capsule, has the economic advantage of requiring only a single pipeline for the two commodities being transported, thereby decreasing the capital costs considerably while at the same time causing minimal disturbance to the thermal environment en route, such as would be caused by a relatively hot oil pipeline in permafrost areas. An additional advantage of the present invention is the decreased stringency of pipe specifications for transmission at liquefied natural gas temperatures.

To illustrate the magnitude of the economic impact to be gained by using the present invention, it has been reported in "Studies confirm feasibility of Artic Lines," the Oil and Gas Journal, Feb. 5, 1973, that two 48 inch pipelines are required to transport 1.8 million barrels of oil and 3.5 billion cu.ft. of gas per day. If the natural gas is liquefied, this amount of hydrocarbons can be moved simultaneously in one 60 inch diameter pipeline where the volume ratio of oil to natural gas is 2:1. The attendant savings in pipeline capsule cost based on the cost published for the proposed two pipelines will be of the order of $3 billion. This saving is offset by the capital cost of liquefaction facilities, estimated at $1 billion.

We claim:

1. A method of transporting oil and natural gas along a pipeline, comprising:
   a. pumping the natural gas along a pipeline in a liquefied state,
   b. freezing by a controlled rate of introduction of discrete, molded, liquid bodies of the oil into the liquefied natural gas, the oil into bodies having a frozen outer skin to retain the molded shape, and of sufficient size for single row distribution only along the pipeline,
   c. conveying the said discrete, substantially frozen bodies in the frozen condition in single row distribution along at least a portion of the said pipeline by the said liquefied natural gas being pumped therealong,
   d. removing the thus conveyed discrete, substantially frozen bodies from the said liquefied natural gas in the pipeline, and
   e. melting the separated discrete, substantially frozen bodies for storage in liquid form.

2. A method according to claim 1, wherein the oil is molded by being extruded from a die directly into liquefied natural gas in the pipeline, and the extruded oil in the liquefied natural gas is cut to form the slug bodies as cylinders therein.

3. A method according to claim 1, wherein the discrete frozen bodies are screened from the liquefied natural gas at the delivery end of the pipeline.

4. A method according to claim 1, wherein the oil is molded into spherical bodies having a frozen outer skin to form said discrete, frozen bodies.

* * * * *